(12) United States Patent
Lipsey

(10) Patent No.: US 11,491,663 B2
(45) Date of Patent: Nov. 8, 2022

(54) ROBOTIC FORCE/TORQUE SENSOR WITH CONTROLLED THERMAL CONDUCTION

(71) Applicant: ATI Industrial Automation, Inc., Apex, NC (US)

(72) Inventor: Joseph Lipsey, Holly Springs, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 146 days.

(21) Appl. No.: 16/902,674

(22) Filed: Jun. 16, 2020

(65) Prior Publication Data

US 2021/0387352 A1 Dec. 16, 2021

(51) Int. Cl.
| | |
|---|---|
| *B25J 13/08* | (2006.01) |
| *G01L 1/22* | (2006.01) |
| *B25J 15/00* | (2006.01) |
| *B25J 19/00* | (2006.01) |

(52) U.S. Cl.
CPC .......... *B25J 13/085* (2013.01); *B25J 15/0019* (2013.01); *B25J 19/0054* (2013.01); *G01L 1/2281* (2013.01)

(58) Field of Classification Search
CPC ....... G01L 5/0066; G01L 1/22; G01L 1/2281; A61B 17/07207; B25J 13/085; B25J 15/0019; B25J 19/0054
USPC .................................................. 73/862.338
See application file for complete search history.

(56) References Cited

U.S. PATENT DOCUMENTS

| | | | |
|---|---|---|---|
| 7,743,672 B2* | 6/2010 | Kurtz | G01N 3/08 73/862.046 |
| 9,274,014 B2* | 3/2016 | Janik | G01L 3/1421 |
| 10,422,707 B2 | 9/2019 | Bradford | |
| 2014/0022732 A1 | 1/2014 | Yang | |

(Continued)

FOREIGN PATENT DOCUMENTS

| | | |
|---|---|---|
| CN | 103574557 B | 2/2020 |
| JP | H01262431 A | 10/1989 |

(Continued)

*Primary Examiner* — Octavia Davis Hollington
(74) *Attorney, Agent, or Firm* — Coats & Bennett, PLLC

(57) ABSTRACT

A robotic force/torque (FT) sensor restricts the conduction of heat, generated by an attached tool, through the FT sensor body to a radial direction. Heat from the tool is channeled to the center of the FT sensor body by a thermally conductive member. Additionally, heat from the tool is insulated from portions of the FT sensor body other than its center by a thermally insulating member. Transducers, such as strain gages attached to the surfaces of deformable beams, are disposed at a substantially equal distance from the center of the FT sensor body. Accordingly, as heat conducts through the FT sensor body from the center radially outwardly, all transducers experience substantially equal thermal load at any given time. Embodiments of the present invention substantially eliminate thermal gradients across groups of transducers that are wired in differential circuit topologies, such as half-bridge or quarter-bridge, enhancing the ability of such circuits to reject a common-mode signal component caused by thermal changes to the FT sensor body or the transducers themselves. Elimination of thermal gradients in the FT sensor body, other than one in the radial direction, enhances the effectiveness of known temperature compensation techniques.

19 Claims, 4 Drawing Sheets

(56) References Cited

U.S. PATENT DOCUMENTS

2017/0205296 A1* 7/2017 Bradford ................. G01L 3/108
2017/0211999 A1* 7/2017 Bradford .............. B25J 19/0095

FOREIGN PATENT DOCUMENTS

| JP | 2018072185 A | | 5/2018 |
|----|--------------|---|--------|
| JP | 2018138887   | * | 9/2018 |
| JP | 2019503483 A | | 2/2019 |

* cited by examiner

ROBOTIC FORCE/TORQUE SENSOR WITH CONTROLLED THERMAL CONDUCTION

FIELD OF INVENTION

The present invention relates generally to force/torque sensors for robotics applications, and in particular to a force/torque sensor having predictable distribution of heat through the sensor body during operation.

BACKGROUND

Robotics is a growing, and increasingly important, field in industrial, medical, scientific, aerospace, and other applications. In many cases, in which a robot arm or a tool attached thereto contacts a workpiece, the force and/or torque applied must be closely monitored. Accordingly, a force/torque sensor is an important part of many robotic systems.

Numerous types of force/torque sensors are known in the art. One known type of force/torque sensor uses mechanical-to-electrical transducers, such as strain gages, to measure the deformation of small beams connecting two areas of a sensor body—one such area being connected to the robot arm and the other area connected to a robotic tool. For example, a central area of the sensor body, conventionally known in the art as a Tool Adapter Plate (TAP), and referred to herein as a "tool interface area," is connected (directly or indirectly) to a tool. Another area of the sensor body arranged annularly around, and spaced apart from, the tool interface area, conventionally known in the art as a Mounting Adapter Plate (MAP), and referred to herein as a "mounting interface area," is connected (directly or indirectly) to a robotic arm. While the tool and mounting interface areas could be, in some embodiments, separate parts that are assembled into a force/torque sensor, in many modern designs, the force/torque sensor body is a unitary design, for example milled from a single block (or disc) of metal. The terms tool and mounting interface areas refer to both types of force/torque sensor construction.

Of course, in any given application, the robot may be connected to the tool interface area and a tool connected to the mounting interface area. Accordingly, the terms tool interface area and mounting interface area are used herein as terms of reference only. Additionally, as well known in the art, one or more other devices may be interposed between the force/torque sensor and either a tool or the robot, such as for example the master and tool units of a robotic tool changer.

The mounting interface area and tool interface area are connected to each other by a plurality of relatively thin (and hence mechanically deformable) beams, arranged radially around the tool interface area—in some cases resembling spokes of a wheel. Relative force or torque between objects respectively attached to the tool interface area and mounting interface area attempt to move the mounting interface area relative to the tool interface area, resulting in slight deformation, or bending, of at least some of the beams.

Transducers, such as strain gages, are affixed to some or all surfaces of at least some of the beams, in various positions and orientations. The gages, which exhibit strain-dependent resistance, translate tensile and compressive strains at the beams' surfaces, caused by mechanical deformation of the beams, into electrical signals. Once calibrated, signals from the strain gages on the instrumented beams are processed together to resolve the magnitude and direction of relative force and/or torque between the tool interface area and mounting interface area, and hence between a tool and the robot. As non-limiting examples, U.S. Patent Publications 2017/0211999 and 2017/0205296, and international publication WO 2018/200668, all assigned to the assignee of the present disclosure, describe force/torque sensors for robotic applications. These disclosures are incorporated by reference herein, in their entireties.

As known in the art, and as discussed in the above-incorporated disclosures, thermal changes have a deleterious effect on accurate force/torque measurement. Errors arise, for example, from changes in the resistance of the sensors and/or cabling, and from sensor body material expansion, as well as other effects.

Silicon strain gages are preferred for many applications due to their high sensitivity, compared to foil strain gages. However, they exhibit significantly worse temperature performance. There are two main temperature effects in silicon strain gages—strain gage Temperature Coefficient of Resistance (TCR) and strain gage Temperature Coefficient of Gage Factor (TCGF). TCR arises as the resistance of a silicon strain gage changes with its temperature. In some gages, resistance can change more over a 0-50° C. temperature swing than it changes due to full scale sensor loading. TCGF arises because the gage factor of a silicon gage—which describes the correlation between strain experienced by a gage and the resulting change in its resistance—is temperature-dependent. The resistance of conductors used to connect strain gages together, and to measurement electronics, is also temperature-dependent.

As temperature increases, a metallic force/torque sensor body will expand, to a degree described by the expansion coefficient of the material. For example, the expansion coefficient of steel is approximately 11 ppm/K, meaning one could expect an expansion of 11 um/m for a thermal increase of one degree Celsius. This expansion will be "detected" by surface strain gages as an apparent strain, even with no mechanical load applied.

Other thermal factors that can introduce error (although generally not as prominent as those discussed above) include erroneous non-common-mode outputs of a balanced circuit of strain gages, with a temperature gradient across it; the temperature dependence of the modulus of elasticity of the sensor body material; self-heating of the strain gages due to excitation voltage; the relative humidity and hygroscopy of the strain gage carrier material; and temperature-dependent changes in the effectiveness of adhesives used to bond strain gages to the sensor body surfaces.

Attempts have been made in the art to counter the deleterious effects of temperature changes on force/torque sensors. Self-compensated strain gages, which have a temperature behavior adapted to specific material, exhibit fewer temperature-dependent effects. However, self-compensated strain gages are more complex and expensive than conventional strain gages, and must be carefully matched to the force/torque sensor body material. Additionally, some circuit configurations, such as a half-Wheatstone bridge circuit, cause temperature-induced variation to appear as a common mode signal which is cancelled, at least where all strain gages in the bridge experience the same temperature change (as noted above, a thermal gradient across the bridge configuration destroys this assumption).

As discussed in the above-incorporated disclosures, advanced techniques are known in the art for compensating strain gage readings for temperature-induced errors. For example, U.S. 2017/0205296 discloses affixing a strain gage to a non-stressed portion of the sensor body. Any apparent strain this gage detects due to expansion of the sensor body, as well as changes in the resistivity of the sensor and/or cabling, are purely thermally induced, and can be mathematically removed from the outputs of other strain gages, when measuring actual forces and torques. WO 2018/200668 discloses the use of thermal sensors proximate strain gages, and explicit compensation of individual strain gage outputs for local changes in temperature. This publication also discloses a transient temperature compensation methodology, whereby transient temperature distribution throughout the sensor body is modeled, and thermally-induced strains are predicted and removed from the measured signals.

In general, these techniques are most effective where the change in temperature is uniform across the force/torque sensor body—which is rarely the case in real-world applications. Even accepting the inevitability of uneven heating, however, it would be advantageous to control the heating such that essentially all of the strain gages experience temperature changes at substantially the same time.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a robotic force/torque (FT) sensor restricts the conduction of heat generated by an attached tool, through the FT sensor body, to a radial direction. Heat from the tool is channeled to the center of the FT sensor body by a thermally conductive member. Additionally, portions of the FT sensor body other than its center are insulated from heat generated by the tool by a thermally insulating member. Transducers, such as strain gages attached to the surfaces of deformable beams, are disposed at a substantially equal distance from the center of the FT sensor body. Accordingly, as heat conducts through the FT sensor body from the center radially outwardly, all transducers experience substantially equal thermal load at any given time. Embodiments of the present invention substantially eliminate thermal gradients across groups of transducers that are wired in differential circuit topologies, such as half-bridge or quarter-bridge, enhancing the ability of such circuits to reject a common-mode signal component caused by thermal changes to the FT sensor body or the transducers themselves. Elimination of thermal gradients in the FT sensor body, other than one in the radial direction, enhances the effectiveness of known temperature compensation techniques.

One embodiment relates to a robotic force/torque sensor interposed between a robot and a heat-generating tool. The robotic force/torque sensor includes a tool interface area having a central bore; a mounting interface area disposed annularly around, and spaced apart from, the tool interface area; a plurality of deformable beams extending radially around the tool interface area and connecting the tool interface area to the mounting interface area; transducers affixed to surfaces of at least some of the deformable beams and configured to transduce tensile and compressive strains at the deformable beam surfaces to electrical signals; a thermally conductive member configured to contact the central bore in thermally conductive relationship; and a thermally insulating member configured to insulate portions of the robotic force/torque sensor other than the central bore from thermal contact with the thermally conductive member.

Another embodiment relates to a method of operating a robotic force/torque sensor having a tool interface area having a central bore, a mounting interface area disposed annularly around, and spaced apart from, the tool interface area, a plurality of deformable beams extending radially around the tool interface area and connecting the tool interface area to the mounting interface area, and transducers affixed to surfaces of at least some of the deformable beams and configured to transduce tensile and compressive strains at the deformable beam surfaces to electrical signals. A thermally conductive member is placed in thermally conductive relationship with the central bore. Portions of the robotic force/torque sensor other than the central bore are insulated from thermal contact with the thermally conductive member by use of a thermally insulating member. Heat from a heat-generating tool attached to the thermally conductive member is conducted through the thermally conductive member to the central bore, and conducts radially outwardly through the tool interface area and deformable beams.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
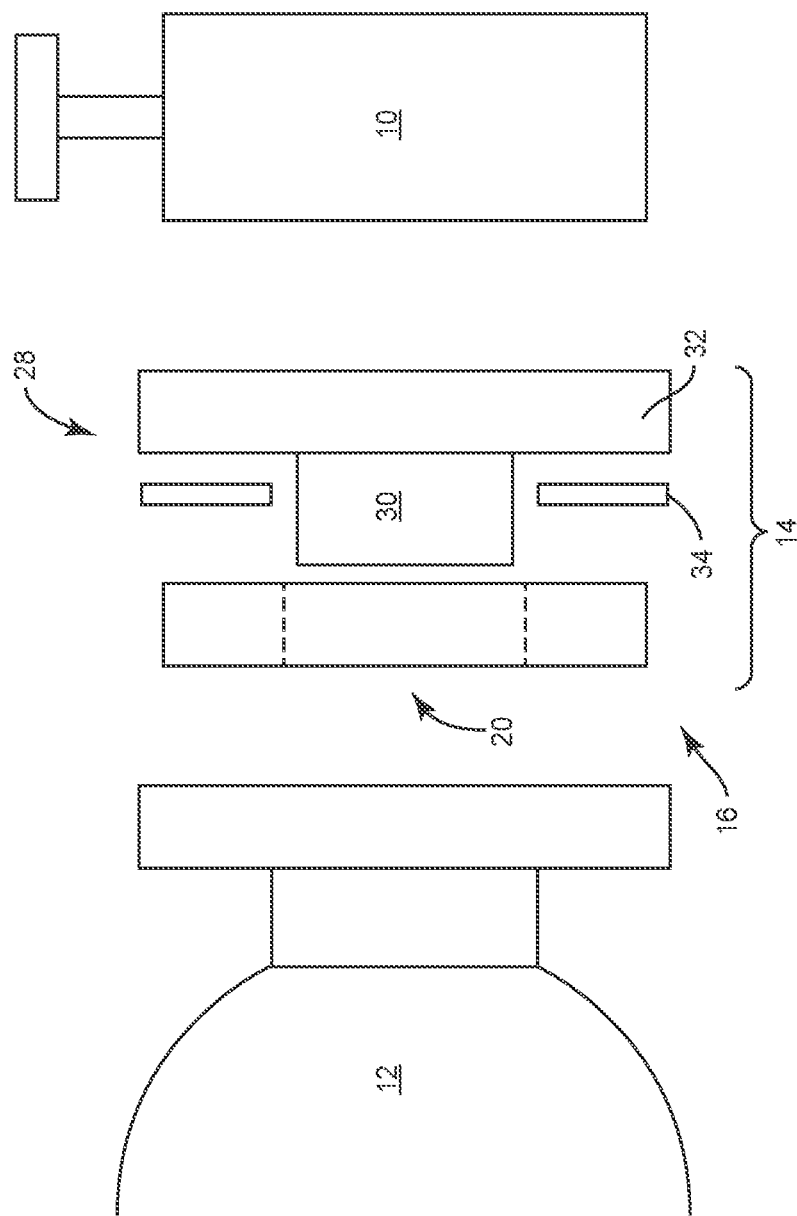
FIG. 1 is an exploded sectional view of a force/torque sensor in operational context.

FIG. 1 is an exploded sectional view of a typical tool 10, such as a grinder, attached to a robot arm 12, such as may be deployed in a factory or other application. A robotic force/torque (FT) sensor 14 is interposed between the tool 10 and the robot 12. The FT sensor 14 measures forces and torques between the robot 12 and the tool 10, i.e., as the robot 12 presses the tool 10 against a workpiece. As known in the art, other components may be included in this "stack," such as robotic tool changer components that provide a mechanical interface and provide for the passing of utilities between a robot 12 and attached tool 10. Many tools 10 generate a significant amount of heat, which is conducted to connected metallic components, such as the FT sensor 14. Haphazard temperature gradients resulting from uneven/ uncontrolled heating of the FT sensor 14 body are a significant source of errors force and torque measurements.

Figure 2:
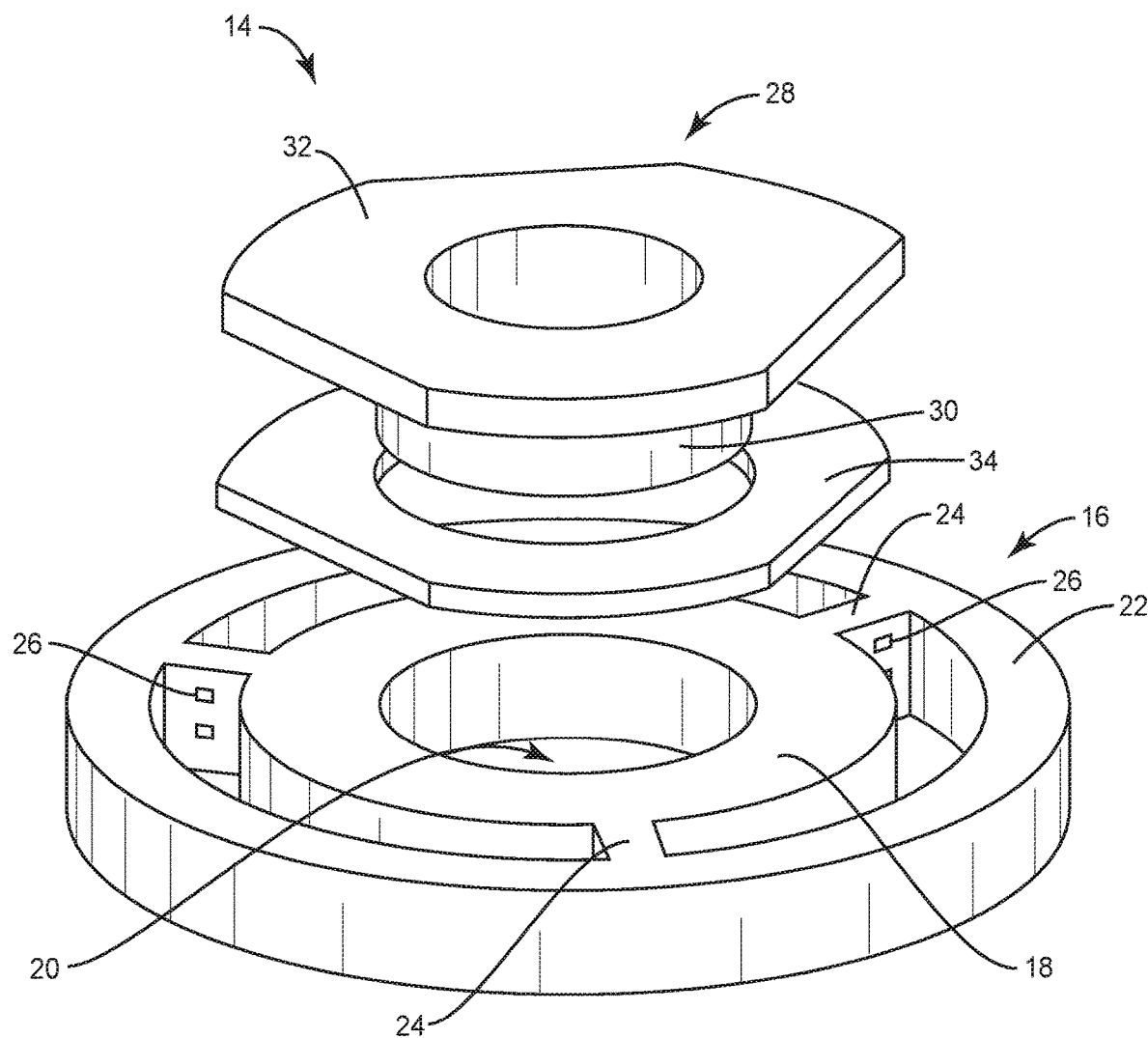
FIG. 2 is an exploded perspective view of a force/torque sensor.

FIG. 2 depicts the FT sensor 14. The FT sensor body 16 comprises a tool interface area 18 having a central bore 20, a mounting interface area 22, and a plurality of deformable beams 24 connecting the tool interface area 18 and mounting interface area 22. The mounting interface area 22 is disposed annularly around the tool interface area 18, and spaced apart from it. The deformable beams 24 extend radially around the tool interface area 18. The embodiment depicted in FIG. 2 has three deformable beams 24—a configuration depicted and described in the above-incorporated publication U.S. 2017/0205296. However, this configuration is not limiting, and in general, any number of deformable beams 24 may be used.

Transducers 26 are affixed to surfaces of at least some of the deformable beams 24. The transducers 26 are configured to transduce tensile and compressive strains at the deformable beam surfaces to electrical signals. In the embodiment depicted in FIG. 2, the transducers 26 comprise strain gages, such as silicon strain gages, which exhibit a mechanical strain-dependent resistance. However, embodiments of the present invention are not limited to the use of silicon (or other types of) strain gages as transducers 26. The transducers 26 may be attached to only one surface of each instrumented deformable beam 24, such as the uppermost surface, or they may be attached to some or all surfaces of each instrumented deformable beam 24, such as opposite surfaces. A variety of wiring topologies for strain gages are known, such as the Wheatstone bridge, half-bridge, and quarter-bridge configurations. Note that wiring connecting the transducers 26, and measurement circuits that resolve the generated electrical signals into forces and torques, are not depicted in FIG. 2. Preferably, the transducers 26 are affixed to the surfaces of deformable beams 24 at substantially the same distance along the beams' length, as measured from the tool interface area 18.

Consider a conventional FT sensor, comprising only the body 16 and transducers 26. A tool may attach directly to the tool interface area 18 (or mounting interface area 22), or through a thermally conductive (i.e., metallic) device. As the tool operates, an electric motor, welding head, or the like may generate significant heat. This heat is conducted to the facing surface of the tool interface area 18, e.g., the upper surface, as depicted in FIG. 2. While the heat will conduct along the deformable beams 24 towards the mounting interface area 22, it also conducts from the upper surface of the tool interface area 18 (and deformable beams 24) through the body of the FT sensor 14 to the lower surface. That is, an axial thermal gradient develops within the FT sensor body 16, in addition to any radial gradient as the heat flows down the deformable beams 24 towards the mounting interface area 22. These bi-directional thermal gradients (axial and radial) are difficult to model accurately. Accordingly, it is difficult to account for them in applying temperature compensation techniques to the transducers 26. Furthermore, an unstressed transducer 26 used to measure, and hence subtract, thermally induced strains, is of limited use, as different parts of the FT sensor body 16 will be at different temperatures.

In particular, in the common case that transducers 26 are attached to opposite sides of instrumented deformable beams 24—such as the upper and lower surfaces, as depicted in FIG. 2—and these transducers 26 are wired in a differential configuration such as a half-bridge, an axial thermal gradient will heat the upper surface transducer 26 before the one on the lower surface. Because temperature-induced changes in outputs of the two transducers 26 are different, the half-bridge circuit cannot reject these changes as a common-mode signal.

According to embodiments of the present invention, heat from an attached tool is channeled to the center of the tool interface area 18—and only there. The heat then conducts through the FT sensor body 16 only radially—through the tool interface area 18 and down the deformable beams 24 towards the mounting interface area 22. While this results in a thermal gradient that affects FT sensor 14 operation, it is a predictable gradient. For example, the heat is applied to substantially the entire thickness of the tool interface area 18, substantially simultaneously. Accordingly, as the heat is conducted radially outwardly through the tool interface area 18 and into the deformable beams 24, there is little or no thermal gradient in a radial direction. This means that transducers 26 attached to the upper and lower surfaces of instrumented deformable beams 24 will experience temperature changes substantially simultaneously, and of substantially the same magnitude. Accordingly, a balanced circuit topology, such as a half-bridge, will reject the common-mode temperature-induced strain, and the half-bridge will output only signals corresponding to deformation of the beam 24 by applied forces and torques. Attaching all transducers 26 to the various surfaces of deformable beams 24 at substantially the same distance along the length of the beams 24, as measured from the tool interface area 18, ensures that the transducers all experience a temperature change at substantially the same time. These controlled, predictable aspects of heat flow through the FT sensor 14 greatly simplify the application of temperature compensation techniques to the outputs of the transducers 26.

In one embodiment, as depicted in FIG. 2, the heat from an attached tool is channeled to the tool interface area central bore 20 by a thermally conductive member 28. The thermally conductive member 28 includes a portion, such as a shank 30, that is disposed within the central bore 20. The shank 30 of the thermally conductive member 28 contacts the central bore 20 in a thermally conductive relationship. For example, in one embodiment the shank 30 forms a tight physical fit to the inner surface of the central bore 20. In another embodiment, the shank 30 is press-fit into the central bore 20. In yet another embodiment, space between the shank 30 and the central bore 20 is filled with a thermally conductive paste. The shank 30 may be a cylindrical pipe, as depicted, or may be solid. Furthermore, although the central bore 20 and shank 30 are depicted as being circular and cylindrical, respectively, these shapes are not limiting. The central bore 20 and shank 30 may be rectangular, star-shaped, or of any other mating shapes that achieve contact in a thermally conductive relationship.

As its name implies, the thermally conductive member 28 is formed from a material with high thermal conductivity, such as aluminum or copper. In addition to high thermal conductivity, the thermally conductive member 28 must exhibit sufficient strength and stiffness to support an attached tool, and to transfer forces and torques from the tool to the tool interface area 18, with substantially no bending, compression, or other deformation. To facilitate rigid connection to the tool interface area 18, the thermally conductive member 28 includes a flange 32. As discussed further herein, the flange 32 may be connected to the tool interface area 18 by bolts or other fasteners, or by other means.

To ensure that heat from an attached tool is channeled only to the central bore 20, and does not conduct into the upper face of the tool interface area 18, a thermally insulating member 34 is interposed between the flange 32 of the thermally conductive member 28 and the facing surface of the tool interface area 18. In the embodiment depicted in FIG. 2, the thermally insulating member 34 is a flat, annular ring—i.e., a large washer, although this shape is not limiting. The thermally insulating member 34 is configured to insulate all portions of the FT sensor 14, other than the central bore 20, from thermal contact with the thermally conductive member 28. Accordingly, it is preferably at least co-extensive with the flange 32 of the thermally conductive member 28, and in some embodiments may extend radially beyond the flange 32. As its name implies, the thermally insulating member 34 is formed from a material having a low thermal conductivity, such as titanium, stainless steel, fiberglass, or the like. In addition to low thermal conductivity, the thermally insulating member 34 must exhibit sufficient strength and stiffness to pass forces and torques from the flange 32 of the thermally conductive member 28 to the tool interface area 18, with substantially no bending, compression, or other deformation.

Figure 3:
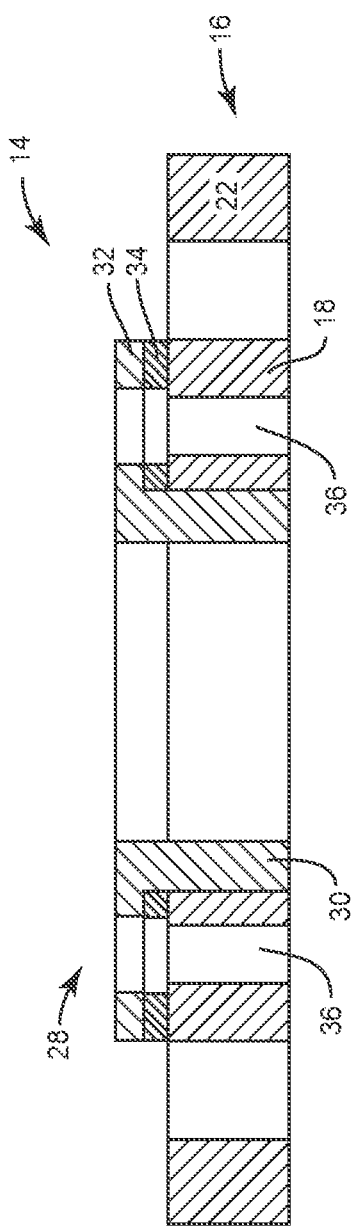
FIG. 3 is a section view of the force/torque sensor.

FIG. 3 is a section view of the FT sensor 14 in operational configuration (FIG. 1 depicts this configuration in exploded section view). The FT sensor body 16 comprises a tool interface area 18, mounting interface area 22, and a plurality of deformable beams 24 (not shown in FIG. 3) connecting the tool interface area 18 to the mounting interface area 22. At least some of the deformable beams 24 are instrumented with transducers 26. The thermally conductive member 28—comprising a shank 30 and flange 32—is disposed within and over the FT sensor 14 such that the shank 30 fits within the central bore 20 of the tool interface area 18, and the flange 32 extends at least partially over the upper surface of the tool interface area 18. The thermally insulating member 34 is interposed between the flange 32 of the thermally conductive member 28 and the tool interface area 18 of the FT sensor 14. In one embodiment, the thermally conductive member 28 is rigidly affixed to the tool interface area 18 by a plurality of fasteners 36, such as countersunk bolts, connecting the flange 32 to the tool interface area 18, and extending through through-holes in the thermally insulating member 34. The fasteners 36 (e.g., bolts, screws, rivets, etc.) are preferably formed of a metal having a low thermal conductivity, such as 316 stainless steel. Other means of rigidly affixing the thermally conductive member 28 and thermally insulating member 34 to the FT sensor 14 are within the scope of embodiments of the present invention. For example, in one embodiment adhesive is applied between the flange 32 one face of the thermally insulating member 34, and also between the other face of the thermally insulating member 34 and the facing side of the tool interface area 18.

In practice, a robotic tool attached (directly or indirectly) to the thermally conductive member 28 of the FT sensor 14, such as a welding head, a tool such as a drill or grinder having an electric motor, or the like, generates a significant amount of heat. This heat is channeled by the thermally conductive member 28 to the central bore 20 of the tool interface area 18, where it conducts radially outward through the FT sensor 14, substantially equally in every radial direction. The thermally insulating member 34 insulates the FT sensor 14 (in particular, the facing surface of the tool interface area 18) from the heat, ensuring that substantially all of the heat conducted from the tool is directed to the tool interface area 18 central bore 20. This configuration substantially eliminates any thermal gradient in an axial direction—that is, across the thickness of the FT sensor body 16. Because the transducers 26 attached to the instrumented deformable beams 24 are positioned at a substantially equal distance along the beams' length, measured from the tool interface area 18, each transducer 26 experiences a substantially equal thermal load at any given time. In particular, thermal gradients across transducers 26 wired together in a differential circuit topology, such as a half-bridge or quarter-bridge, are substantially eliminated, allowing the differential circuit to effectively eliminate the common-mode thermal component of changes in output.

Figure 4:
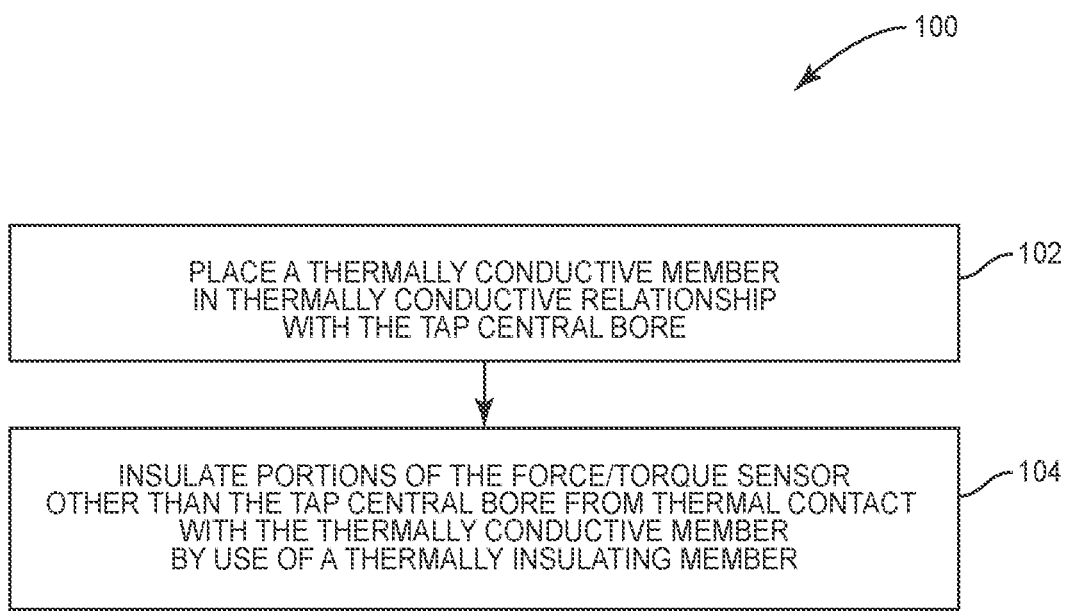
FIG. 4 is a flow diagram of a method of operating a robotic force/torque sensor.

FIG. 4 depicts the steps in a method 100 of operating a robotic FT sensor 14. As described above, the FT sensor 14 has a tool interface area 18 having a central bore 20; a mounting interface area 22 disposed annularly around, and spaced apart from, the tool interface area 18; a plurality of deformable beams 24 extending radially around the tool interface area 18 and connecting the tool interface area 18 to the mounting interface area 22; and transducers 26 affixed to surfaces of at least some of the deformable beams 24 and configured to transduce tensile and compressive strains at the deformable beam surfaces to electrical signals. A thermally conductive member 28 is placed in thermally conductive relationship with the central bore 20 (block 102). Portions of the FT sensor 14 other than the central bore 20 are insulated from thermal contact with the thermally conductive member 28 by use of a thermally insulating member 34 (block 104). In operation, heat from a heat-generating tool attached (directly or indirectly) to the thermally conductive member 28 is conducted through the thermally conductive member 28 to the central bore 20, and conducts radially outwardly through the tool interface area 18 and deformable beams 24. In this manner, transducers 26 attached to some of the deformable beams 24 experience substantially the same thermal load at the same time, thereby simplifying temperature compensation techniques.

Embodiments of the present invention present significant advantages over FT sensors of the prior art, particularly in applications where an attached tool generates heat. By channeling this heat to the center of the tool interface area 18, and otherwise insulating the FT sensor 14 from the heat, substantially even heat conduction through the FT sensor body 16, in a strictly radial direction, is ensured. By locating the transducers 26 substantially equidistant from the tool interface area 18, all transducers 26 are assured of a substantially even thermal load, allowing know temperature compensation techniques to operate with greater efficiency and accuracy.

As used herein, a material described as having a high thermally conductivity has a thermal conductivity k greater than about 100 BTU/hr-ft-F. A material described herein as having a low thermally conductivity has a thermal conductivity k less than about 50 BTU/hr-ft-F. As used herein, the term "configured to" means set up, organized, adapted, or arranged to operate in a particular way; the term is synonymous with "designed to." As used herein, the term "substantially" encompasses and accounts for mechanical tolerances, measurement error, random variation, and similar sources of imprecision.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A robotic force/torque sensor interposed between a robot and a heat-generating tool, comprising:
    a tool interface area having a central bore;
    a mounting interface area disposed annularly around, and spaced apart from, the tool interface area;
    a plurality of deformable beams extending radially around the tool interface area and connecting the tool interface area to the mounting interface area;
    transducers affixed to surfaces of at least some of the deformable beams and configured to transduce tensile and compressive strains at the deformable beam surfaces to electrical signals;
    a thermally conductive member configured to contact the central bore in thermally conductive relationship; and
    a thermally insulating member configured to insulate portions of the robotic force/torque sensor other than the central bore from thermal contact with the thermally conductive member.

2. The robotic force/torque sensor of claim 1 wherein heat from the heat-generating tool is conducted through the thermally conductive member to the central bore, and conducts radially outwardly through the tool interface area and deformable beams.

3. The robotic force/torque sensor of claim 2 wherein the transducers comprises strain gages affixed to the surfaces of deformable beams at substantially the same distance along the beams' length, measured from the tool interface area, whereby all strain gages experience temperature changes due to the heat-generating tool at substantially the same time.

4. The robotic force/torque sensor of claim 1 wherein the thermally conductive member comprises:
    a shank sized and shaped to thermally contact an inner surface of the central bore; and
    a flange connected to the shank and sized and shaped to extend at least partially over a first surface of the tool interface area.

5. The robotic force/torque sensor of claim 4 wherein the shank is press-fit into the central bore.

6. The robotic force/torque sensor of claim 4 further comprising a thermally conductive paste between the thermally conductive member shank and the inner surface of the central bore.

7. The robotic force/torque sensor of claim 4 wherein the thermally insulating member comprises:
    an annular ring disposed between the first surface of the tool interface area and the flange of the thermally conductive member.

8. The robotic force/torque sensor of claim 7 further comprising fasteners connecting the thermally conductive member flange and the tool interface area, with the thermally insulating member interposed between the flange and the tool interface area.

9. The robotic force/torque sensor of claim 7 wherein adhesive connects one side of the thermally insulating member to the flange of the thermally conductive member, and adhesive connects the other side of the thermally insulating member to a facing surface of the tool interface area.

10. The robotic force/torque sensor of claim 1 wherein the heat-generating tool is attached to the thermally conductive member.

11. A method of operating a robotic force/torque sensor having a tool interface area having a central bore, a mounting interface area disposed annularly around, and spaced apart from, the tool interface area, a plurality of deformable beams extending radially around the tool interface area and connecting the tool interface area to the mounting interface area, and transducers affixed to surfaces of at least some of the deformable beams and configured to transduce tensile and compressive strains at the deformable beam surfaces to electrical signals, the method comprising:
    placing a thermally conductive member in thermally conductive relationship with the central bore; and
    insulating portions of the robotic force/torque sensor other than the central bore from thermal contact with the thermally conductive member by use of a thermally insulating member;
    whereby heat from a heat-generating tool attached to the thermally conductive member is conducted through the thermally conductive member to the central bore, and conducts radially outwardly through the tool interface area and deformable beams.

12. The method of claim 11 wherein the transducers comprise strain gages affixed to the surfaces of deformable beams at substantially the same distance, along the beams' length, from the tool interface area, whereby all strain gages experience temperature changes due to the heat-generating tool at substantially the same time.

13. The method of claim 11 wherein the thermally conductive member comprises:
    a shank sized and shaped to thermally contact an inner surface of the central bore; and
    a flange connected to the shank and sized and shaped to extend at least partially over a first surface of the tool interface area.

14. The method of claim 13 wherein the shank is press-fit into the central bore.

15. The method of claim 13 further comprising placing a thermally conductive paste between the thermally conductive member shank and the inner surface of the central bore.

16. The method of claim 13 wherein the thermally insulating member comprises:
    an annular ring disposed between the first surface of the tool interface area and the flange of the thermally conductive member.

17. The method of claim 16 further comprising connecting the thermally conductive member flange to the tool interface area with fasteners, with the thermally insulating member interposed between the flange and the tool interface area.

18. The method of claim 16 further comprising applying adhesive between one side of the thermally insulating member and the flange of the thermally conductive member, and applying adhesive between the other side of the thermally insulating member and a facing surface of the tool interface area.

19. The method of claim 11 further comprising attaching the heat-generating tool to the thermally conductive member.

* * * * *